UNITED STATES PATENT OFFICE.

MOOSHEGH VAYGOUNY, OF BERKELEY, CALIFORNIA, ASSIGNOR TO ROYAL BAKING POWDER COMPANY, A CORPORATION OF NEW JERSEY.

BAKING-POWDER.

1,214,726.      Specification of Letters Patent.      Patented Feb. 6, 1917.

No Drawing.      Application filed February 1, 1912. Serial No. 674,750.

*To all whom it may concern:*

Be it known that I, MOOSHEGH VAYGOUNY, a citizen of the United States, residing at Berkeley, county of Alameda, and State of California, have invented a new and useful Improvement in Baking-Powder, of which the following is a specification.

The invention relates to improvements in baking powders and has for its object the production of a leavening agent superior in many respects to those heretofore known.

The most desirable of the baking powders heretofore commercially known have been those containing ordinary bitartrate of potassium, which is the acid salt of ordinary tartaric acid (*i. e.*, dextrotartaric acid), to which is added bicarbonate of sodium and a suitable filling material, as starch or flour, or the like. In the presence of water or water-containing substances, like dough, the potassium bitartrate of such baking powders acts upon the bicarbonate of sodium and liberates carbonic acid gas, which thereby exerts a leavening action.

The chief disadvantages inherent in the use of bitartrate of potassium in baking powders are the relative wastefulness or inefficiency due to the fact that the bitartrate of potassium is an acid salt and hence only half its tartaric acid is available; so that it is less than half as strong as a corresponding weight of free tartaric acid; and its undue sluggishness as a leavening agent owing to its excessive insolubility, to remedy which it has been found desirable in practice to introduce a certain quantity of free ordinary tartaric acid, an expedient which, however, involves the disadvantages necessarily attaching to the use of ordinary free tartaric acid.

The disadvantages attaching to the use of ordinary tartaric acid and the reason why the tartaric compound in this class of baking powders has been mainly used in the form of bitartrate of potassium or cream of tartar may be indicated, in part, as follows:—Ordinary tartaric acid is excessively soluble and rather hygroscopic in the sense of absorbing moisture. From these qualities result a too rapid reactivity with bicarbonates when in use, producing a too rapid and irregular evolution of gas in the mass of dough to be leavened, and a baking powder of relatively poor stability.

Now I have found that all the desirable qualities and advantages of cream of tartar, on the one hand, and of ordinary tartaric acid, on the other hand, may be attained in a higher degree by using as the acid ingredient in the composition of baking powder the other isomers of tartaric acid, namely, mesotartaric acid and especially racemic tartaric acid, hereinafter for brevity called racemic acid. Further, the same object may be obtained in some degree by using those modifications of tartaric acids in general which are obtained by suitably dehydrating any of the four isomers, dextro-, levo-, racemic- and mesotartaric acids; that is to say, by using either the simple anhydrous forms of the acids, or the anhydrids or inner anhydrids of the same as the acid ingredient of baking powder. Thus, when racemic acid is used as the acid ingredient in a baking powder otherwise compounded with bicarbonate and starch or flour or other suitable filling matter as usual, the acid component of the resultant powder reacts when in use more uniformly and in a more efficient manner on the bicarbonate present than where cream of tartar alone is used, owing to the greater solubility of the racemic acid; while its leavening action is also far more moderate and less violent than where ordinary tartaric acid is used as the acid ingredient. At the same time, owing to the spontaneous tendency of racemic acid to effloresce, there is practically no danger of its becoming moist under the influence of the humidity, internal or external, to which the powder may be subjected, with the consequence that it yields a product of greater stability and keeping qualities. Furthermore, even where the degree of humidity, atmospheric or otherwise, which has to be contended with is excessive, racemic acid makes an excellent powder, as for this purpose it may be artificially dehydrated at a moderate temperature, say, below 100° C., prior to its use in the manufacture of the baking powder and thus a condition of forced equilibrium is produced, the dehydrated racemic acid possessing a tendency to re-hydrate itself, in other words, to act as a drying agent upon the other ingredients, such as flour and bicarbonate, and even upon the air within the can, thus enhancing the keeping qualities of the baking powder of which it is an ingredient.

What has been said regarding the desirable qualities of racemic acid applies to mesotartaric acid to a great extent, for though it is far more soluble than racemic acid, yet mesotartaric acid is less soluble than ordinary tartaric (dextrotartaric) acid, and as it tends to crystallize more distinctly it is less readily affected by external conditions. Like racemic acid, mesotartaric acid contains water of crystallization, which, when removed by gentle heating, leaves a product of great stability when used in baking powders. Similarly, the desirable qualities possessed so preëminently by racemic acid are also possessed in some degree by the anhydrids of any of the tartaric acids owing to their greater stability in the presence of humidity and smaller solubility than the corresponding normal acids. The biacid salts of these non-dextro-acids. The biacid salts of these non-dextrorotary tartaric acids, such as the biracemates, the bimesotartrates and the bilevotartrates, and their admixtures, also present advantages as the acid component of baking powders. These biacid salts contain the radical of the corresponding acids, and are, of course, acid bodies capable of reacting on bicarbonate of soda and other bicarbonates of alkaline bases with liberation of carbon dioxid, the leavening gas.

The exact composition of the baking powder embodying my invention may vary according to the particular requirements. For example, I may make a mixture of, say, twenty-five parts of racemic acid, twenty-five parts bicarbonate of sodium and fifty parts starch or other filling material. Or a mixture may be made containing thirteen parts racemic acid, twelve parts mesotartaric acid, twenty-five parts bicarbonate of sodium and fifty parts filler. Or ten parts racemic acid, twenty-four parts bitartrate of potassium, twenty-three parts bicarbonate of sodium and forty-three parts filler. Or five parts racemic acid, five parts mesotartaric acid, twenty-four parts bitartrate of potassium, twenty-three parts bicarbonate of sodium and forty-three parts filler. But the foregoing are merely illustrations of the application of my invention, which contemplates considerable variation in its application, according to commercial requirements.

Many applications of my invention in the manufacture of baking powders containing in greater or less proportion one or more of the acids or their modifications or compounds, the use of which in leavening agents I have discovered, will suggest themselves to any one familiar with the subject.

While I have mentioned in the foregoing only the use of any of the acids or anhydrids singly, it is evident, of course, that the acid salts of such acids as I have mentioned may be used in lieu of or in connection with the free acids, and that such salts and acids, singly or in combination, may be employed in baking powders containing other ingredients in order thereby to moderate or control the strength, quality or activity of the baking powder, without departing from the spirit or scope of my invention.

What I claim is:—

1. As a new article of manufacture, a baking powder containing racemic acid.

2. As a new article of manufacture, a baking powder containing a mixture of racemic and mesotartaric acid.

3. As a new article of manufacture, a baking powder containing as an acid component a mixture of acid material comprising the racemic acid radical and acid material comprising the mesotartaric acid radical.

4. As a new article of manufacture, a baking powder containing racemic acid and a bicarbonate of an alkali-forming metal.

5. As a new article of manufacture, a baking powder containing a mixture of racemic acid, mesotartaric acid and a bicarbonate of an alkali-forming metal.

6. As a new article of manufacture, a baking powder containing as an acid component a mixture of acid material comprising the racemic acid radical and acid material comprising the mesotartaric acid radical and also containing a bicarbonate of an alkali forming metal.

7. As a new article of manufacture, a baking powder containing dehydrated racemic acid.

8. As a new article of manufacture, a baking powder containing racemic acid anhydrid.

9. As a new article of manufacture, a baking powder containing as an ingredient a compound comprising the radical of an optically inactive tartaric acid.

10. As a new article of manufacture, a baking powder containing as an ingredient a compound comprising the racemic acid radical.

11. As a new article of manufacture, a baking powder containing a free non-hygroscopic tartaric acid.

12. As a new article of manufacture, a baking powder containing an anhydrid of an optically inactive tartaric acid.

MOOSHEGH VAYGOUNY.

Witnesses:
WILLIS L. GAREY,
HERMAN GUSTOW.